United States Patent [19]
Tessmann et al.

[11] Patent Number: 5,913,710
[45] Date of Patent: *Jun. 22, 1999

[54] METHOD AND DEVICE FOR PRODUCING DRIVE BELTS WITH SMALL ROTATION-ANGLE ERROR

[75] Inventors: Uwe Tessmann, Nussloch; Ralf Degner, Heidelberg, both of Germany

[73] Assignee: Heidelberger Druckmaschinen AG, Heidelberg, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/577,562

[22] Filed: Dec. 22, 1995

[30] Foreign Application Priority Data

Dec. 23, 1994 [DE] Germany .............................. 44 46 163

[51] Int. Cl.$^6$ .................................................. B24B 49/00
[52] U.S. Cl. ................................ 451/10; 451/11; 451/54; 451/184; 451/324
[58] Field of Search .................................... 451/184, 242, 451/246, 336, 54, 58, 8, 9, 10, 11, 28, 324

[56] References Cited

U.S. PATENT DOCUMENTS

| | | | |
|---|---|---|---|
| 3,032,935 | 5/1962 | Lockwood | 451/242 |
| 4,329,192 | 5/1982 | White, Jr. et al. | 451/242 |
| 4,484,413 | 11/1984 | Yamamoto et al. | 451/246 |
| 4,651,472 | 3/1987 | Scheder et al. | 451/246 |
| 4,885,874 | 12/1989 | Wedeniwski | 451/11 |
| 4,941,294 | 7/1990 | Nakagaki | 451/242 |
| 5,214,881 | 6/1993 | Borchardt | 451/246 |
| 5,239,490 | 8/1993 | Masaki et al. | 364/565 |
| 5,392,567 | 2/1995 | Nagai et al. | 451/10 |
| 5,405,285 | 4/1995 | Hirano et al. | 451/9 |
| 5,549,510 | 8/1996 | Fukuda et al. | 451/184 |

FOREIGN PATENT DOCUMENTS

| | | |
|---|---|---|
| 1 648 508 | 3/1971 | Germany . |
| 25 36 418 | 8/1975 | Germany . |
| 27 15 111 | 10/1978 | Germany . |
| 30 39 890 | 1/1984 | Germany . |
| 40 11 724 | 10/1991 | Germany . |
| 43 34 148 | 4/1994 | Germany . |
| 4-296629 | 10/1992 | Japan . |

OTHER PUBLICATIONS

Publ. Industrie–Anzeiger, Essen, No. 60, Jul. 1966, p. 137 "Pruefstand zur Untersuchung der Gleichlauf . . . ".
Publ. Riemenantriebe (Gogoling), pp. 61–63.
Publ. Riesenantriebe (Peeken et al.), pp. 77–79.

*Primary Examiner*—Eileen P. Morgan
*Attorney, Agent, or Firm*—Herbert L. Lerner; Laurence A. Greenberg

[57] ABSTRACT

Method for producing drive belts with small rotation-angle error includes measuring the rotation-angle error of a given drive belt, and then physically altering part of the length of the given drive belt so that the rotation-angle error therein is substantially nullified.

10 Claims, 2 Drawing Sheets

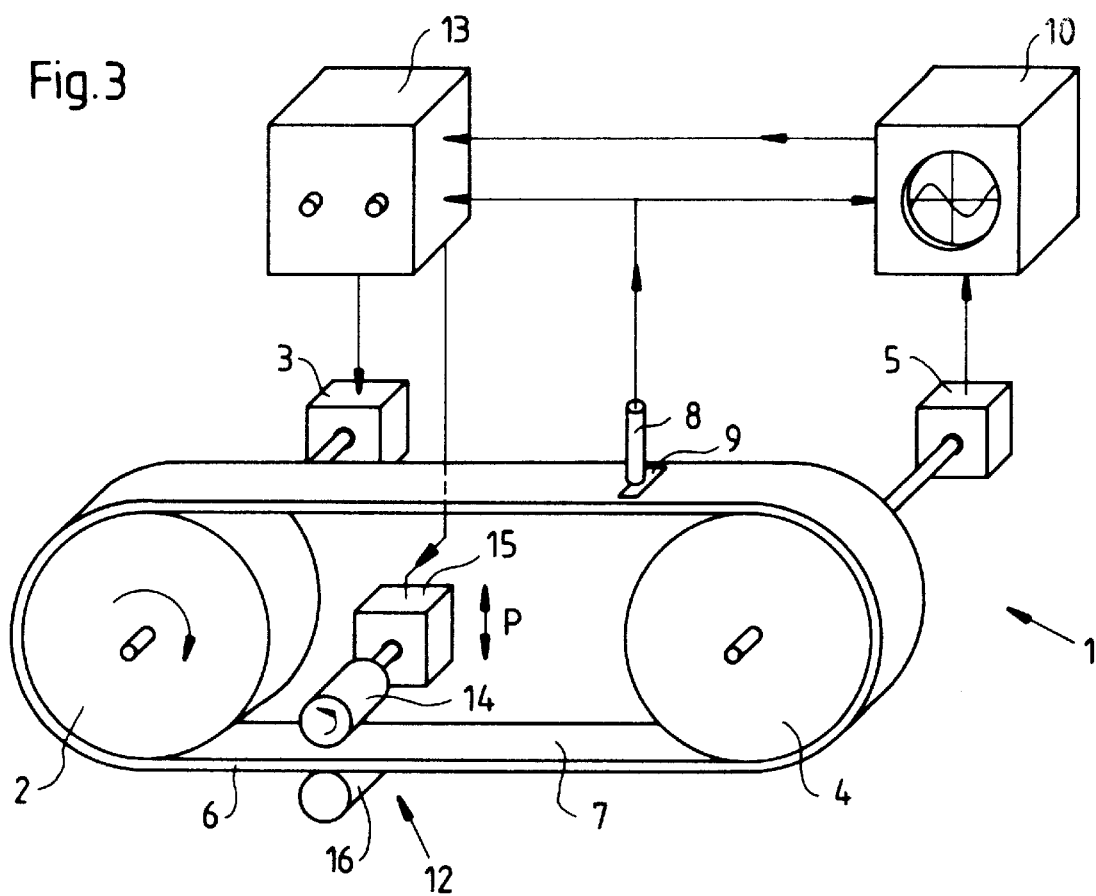
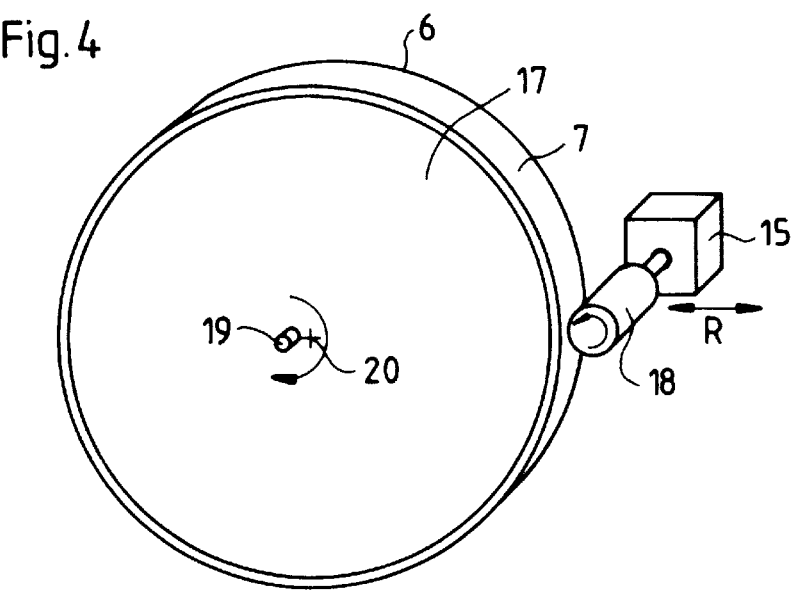

METHOD AND DEVICE FOR PRODUCING DRIVE BELTS WITH SMALL ROTATION-ANGLE ERROR

BACKGROUND OF THE INVENTION

Field of the Invention

The invention relates to a method for producing drive belts with a small rotation-angle error, wherein the rotation-angle error of a specific drive belt is measured; as well as to a device for performing the method.

Particularly smooth-running drive belts must be used for the belt drive of vibration-sensitive machines, such as machine tools and printing presses. Various studies into the causes of torsional vibrations, such as by Gogolin ("Keilriemen—laufruhig selektiert ?", i.e., "V-belts—selected for smooth running ?", in the periodical Antriebstechnik 28, i.e., Drive Technology 28 (1989) No. 5, pp. 61–64) and H. Peeken et al. ("Auswirkungen von Fertigungsabweichungen auf das Betriebsverhalten von Riemenantrieben", i.e., "Effects of manufacturing errors on the operating performance of belt drives" in Antriebstechnik 29 (1990) No. 4, pp 77–80), describe the various types of belt errors and the possibilities for measuring them. Apart from selection, however, these studies do not indicate any possibilities for obtaining particularly smooth-running drive belts.

According to the foregoing studies, one of the major causes of undesired machine vibrations is rotation-angle errors, i.e., deviations in the transmission of the rotational movement of a real belt drive in comparison with an ideal belt drive.

The rotation-angle errors occurring in belts with endlessly wound strands are attributable primarily to geometrical inhomogeneities in the form of fluctuations in the distance or spacing between the strands and the contact surface of the drive belt and also to other inhomogeneities in the construction of the belt. All of these inhomogeneities arise from the manufacture of the belt and cannot be entirely prevented even by improved techniques for winding and vulcanization.

SUMMARY OF THE INVENTION

It is accordingly an object of the invention to provide a method and device for producing drive belts having a low or small rotation-error, without rejects.

With the foregoing and other objects in view, there is provided, in accordance with the invention, a method for producing drive belts with small rotation-angle error, which comprises measuring the rotation-angle error of a given drive belt, and then physically altering part of the length of the given drive belt so that the rotation-angle error therein is substantially nullified.

In accordance with another mode, the method according to the invention includes physically altering the drive belt stepwise, and measuring the rotation-angle error after each alteration step.

In accordance with a further mode, the method according to the invention includes performing the measuring and physically altering steps on a plurality of drive belts of the same type and deriving a relationship therefrom between a measured rotation angle error and the physical alteration of the drive belt required for correcting the rotation-angle error.

In accordance with an added mode of the method according to the invention, the drive belt is physically altered by removing material therefrom.

In accordance with an additional mode, the method according to the invention includes removing the material from a continuous part of the length of the drive belt.

In accordance with yet another mode of the method according to the invention, the material is removed in a machining process.

In accordance with yet a further mode, the method according to the invention includes maintaining the depth of material removal constant along the width of the drive belt, and varying the depth of material removal along the length of the drive belt in accordance with the character of a sinusoidal curve.

In accordance with yet an added mode, the method according to the invention includes performing the measurement of the rotation-angle error and the removal of material during one and the same mounting of the drive belt.

In accordance with yet an additional mode, the method according to the invention includes, after the measuring of the rotation-angle error, mounting the drive belt on a circularly cylindrical mounting device, rotating the mounting device eccentrically, and moving the thus rotating mounting device and a material removal device radially towards one another.

In accordance with still another mode, the method according to the invention includes removing the material from a contact surface of the drive belt.

In accordance with another aspect of the invention, there is provided a device for producing drive belts with small rotation-angle error comprising a device for measuring rotation-angle errors, a device for rotatably mounting the drive belt, a material removing device for removing material from the drive belt, and a positioner for moving the material-removing device and one side of the drive belt towards one another.

In accordance with another feature of the invention, the device for measuring rotation-angle errors comprises a belt drive having a drive motor, a position sensor, a rotation-angle sensor and an evaluating device, the device for rotatably mounting the drive belt being formed of the belt drive, a control device for controlling the drive motor of the belt drive, the positioner and/or the material-removing device, the control device being connected to the position sensor and to the evaluation device.

In accordance with a concomitant feature of the invention, the device for rotatably mounting the drive belt is an eccentrically supported circularly cylindrical mounting device.

Thus, the object of the invention to produce low rotation-error drive belts without rejects is achieved by a method of the type referred to in the introduction hereto which precedes, in the prior art, the selection of low-error drive belts, in that, after the rotation-angle error has been measured, part of the length of the drive belt is physically altered, so that the rotation-angle error is below a tolerable value.

In a device for producing drive belts with small rotation-angle error, a device for measuring rotation-angle errors is provided, the above-mentioned object of the invention is achieved by a device for rotatably mounting the drive belt, a material-removing device for the drive belt, and a positioner for moving the material-removing device and one side of the drive belt towards one another.

The invention is based on the realization that, in drive belts of a given type, there exists a clear relationship between the magnitude and phase position of a measured rotation-angle error and the location and extent of physical alteration of the drive belt required for correcting the rotation-angle error, the physical alteration possibly being effected, for example, by grinding the drive belt in a defined manner. The fact that the aforementioned relationships exist is especially surprising, with regard to the circumstance that irregular fluctuations in the distance or spacing between the strands and the contact surface of the drive belt occur not only in the longitudinal direction but also in the direction of the width of a drive belt. Due to both the unknown and also incalculable position of the strands in the drive belt, it appears impossible to correct the fluctuations in distance or spacing by mechanical working or processing, because each physical alteration of the drive belt should entail unforeseeable changes in the effective distance or spacing between the strands and the contact surface, and therefore changes in the rotation-angle error. This relationship can be empirically determined and is then used, based upon the measurement of the rotation-angle error of a specific drive belt, to determine where and to what extent the drive belt needs to be altered, e.g. ground, in order to correct the aforementioned rotation-angle error. Such correction does not take into account the possibly different individual positions of the strands in the drive belt, but rather, the global rotation-angle error produced thereby.

As long as the relationship between the rotation-angle error and the corresponding processing for a given type of belt is not known or in order to determine such relationship for the first time, it is possible to arrive step-by-step at the extent of alteration of the drive belt, based upon the previously measured rotation-angle error and upon the simplified assumption that the aforementioned fluctuations in distance or spacing describe more-or-less a sinusoidal curve during one revolution of the belt.

The invention unfolds its advantages particularly in case of drive belts for printing presses. Drive belts with rotation-angle errors attributable to manufacturing-based deviations in the positions of the strands from the ideal positions thereof induce rotation-angle fluctuations with the frequency of revolution of the belt at the non-driven side. These rotation-angle fluctuations cause torsional vibrations in the printing-unit cylinders of a printing press, the torsional vibrations possibly resulting in fluctuations of register and in ghosting.

Particularly in the case of printing presses with a plurality of printing units, the large number of transfers of paper requires drive belts with especially low-rotation error. Whereas the improvements in drive-belt manufacturing techniques have reached their limits and whereas selection methods become uneconomic in the case of rising requirements, the invention makes it possible, with relatively little effort, to produce drive belts which are more-or-less free from rotation-angle error.

There are various possible ways of physically altering a drive belt, e.g., a more-or-less considerable removal of material along the length of the belt. If, as in the preferred embodiments, material is removed by grinding the drive belt, it is further preferred that the depth of grinding be kept constant along the width of the drive belt and be varied along the length of the drive belt according to the character of a sinusoidal curve. The latter measure meets the known circumstance or situation that the rotation-angle error, over the length of the belt, describes a sinusoidal curve, in a first approximation, and at the same time prevents the occurrence of any locations of discontinuity or non-uniformity due to the grinding.

In a first embodiment of the device according to the invention, the device for measuring rotation-angle errors includes a belt drive, a position sensor, a rotation-angle sensor and an evaluation devices. In addition, the belt drive forms the rotatable mounting for processing or machining the drive belt. The measurement of the rotation-angle error and the physical alteration of the drive belt by the removal of material are performed during one and the same installation of the drive belt.

In a second embodiment of the device according to the invention, the device for rotatably mounting the drive belt is an eccentrically supported circularly cylindrical mounting device disposed separately from the measuring device. In this case, although the drive belt has to be reinstalled or remounted from one device to another, the aforementioned characteristic curve of the machining profile according to the nature or character of a sinusoidal curve results automatically, without the need for any special control of processing or machining along the length of the drive belt.

Other features which are considered as characteristic for the invention are set forth in the appended claims.

Although the invention is illustrated and described herein as embodied in a method and device for producing drive belts with small rotation-error, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

BRIEF DESCRIPTION OF THE DRAWING

FIG. 3 is a diagrammatic and schematic view like that of FIG. 1 of a device for producing drive belts with small rotation-angle error in accordance with the invention; and FIG. 4 is an enlarged fragmentary diagrammatic view of FIG. 3 showing another embodiment of a device for producing drive belts with small rotation-angle error in accordance with the invention.

DESCRIPTION OF THE PREFERRED EMBODIMENTS

Figure 1:
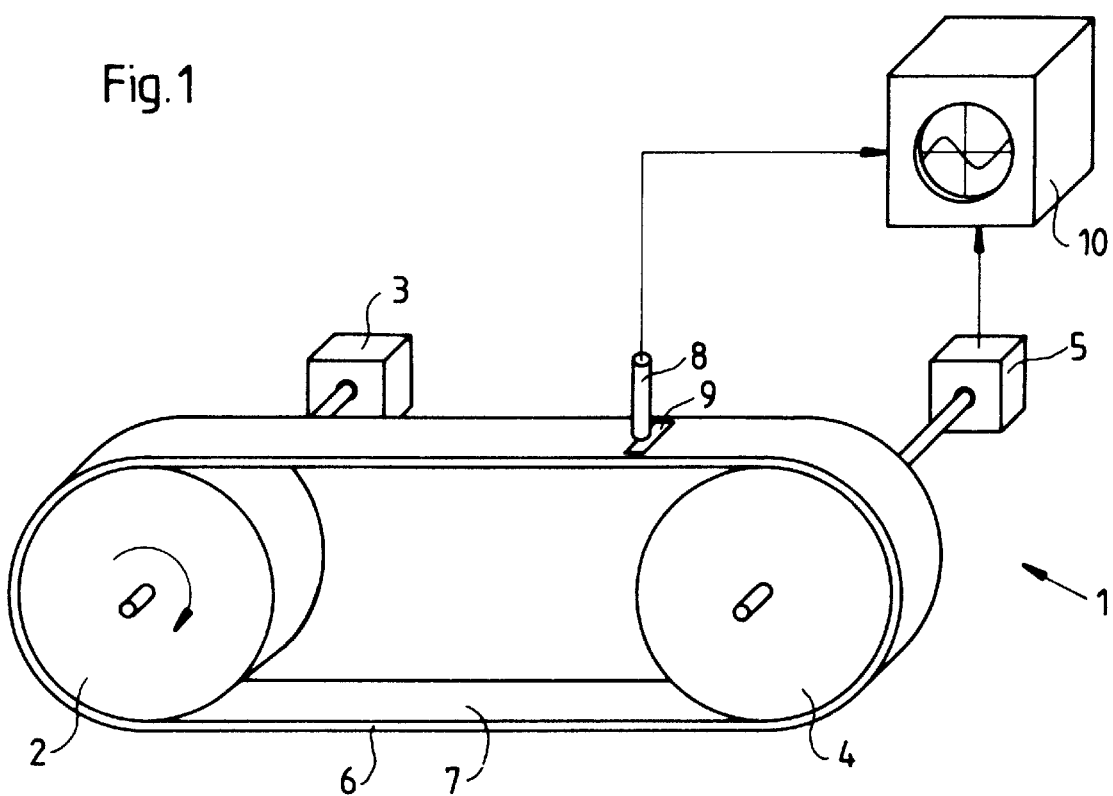
FIG. 1 is a diagrammatic and schematic view of a device for measuring the rotation-angle error of drive belts of the type found in the state of the art.

Referring now to the drawings and, first, particularly to FIG. 1 thereof, there is shown therein a device 1 for measuring rotation-angle errors including a driven pulley 2 connected to a drive motor 3, and a non-driven pulley 4 connected to a rotation-angle sensor 5, which transmits a rotation-angle signal represented by the arrow associated therewith.

Extending around the driven pulley 2 and the non-driven pulley 4 is a drive belt 6 to be tested, the inner side of the drive belt 6 forming a contact surface 7. Adjacent to the drive belt 6 is a position sensor 8, which delivers a trigger pulse when a marking 9 provided on the outside of the drive belt 6 passes the position sensor 8.

The rotation-angle signal and the trigger pulse are supplied to an evaluation device 10, which computes therefrom the rotation-angle error of the drive belt 6, i.e., the angular deviation of the rotational movement of the non-driven pulley 4 from a uniform rotational movement of the driven pulley 2. The rotation-angle error can be displayed as a curve and according to the magnitude and according to the phase position thereof with respect to the mark 9, respectively.

Figure 2A:
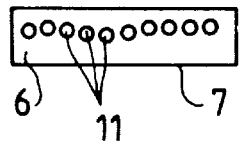
FIGS. 2a to 2c are different cross-sectional views of the same drive belt showing variable positions of strands therein.
Figure 2B:
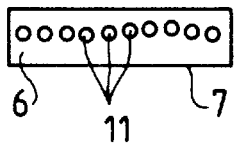
Figure 2C:
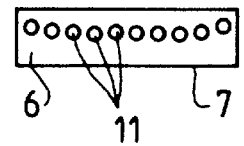

The principal cause of the rotation-angle error becomes apparent from FIGS. 2a, 2b and 2c, which show the positions of strands 11 in a drive belt 6 in cross section and at three different locations in the longitudinal direction of the drive belt 6. As can be seen, the distance between the strands 11 and the contact surface 7 of the drive belt 6 is variable both in the longitudinal direction, as well as in the direction of the width of the drive belt 6.

A first device for correcting the rotation-angle error includes a device 1 for measuring rotation-angle errors, as shown in FIG. 1, the device 1 further having a material-removal device 12 and a control device 13, as shown in FIG. 3. Elements which are identical in both FIGS. 1 and 3 are identified by like reference characters.

In the exemplary embodiment of the invention shown in FIG. 3, the material-removal device 12 includes a grinding disc 14 disposed adjacent to the contact surface 7 of the drive belt 6, and a drive and positioning device 15 with which the grinding disc 14 can be driven and moved in the directions of an arrow P towards and away from the contact surface 7.

Rotatably mounted opposite the grinding disc 14, with the drive belt 6 therebetween, and disposed axially parallel to the grinding disc 14 is a support disc 16 which forms a counter-bearing for the drive belt 6 during grinding.

Although the drive belt 6, the driven pulley 2, the non-driven pulley 4 and the grinding disc 14 are shown without any profile, it is also possible to measure and to process profiled drive belts 6 if the driven pulley 2, the non-driven pulley 4 and the grinding disc 14 are suitably profiled.

If a rotation-angle error is measured with the device 1 and no empirical values for correction of the measured rotation-angle error are yet available for the type of drive belt 6 mounted at the time, then the following procedure may be adopted initially.

Starting from the simplified assumption that the position of the strands 11 changes only along the length of the drive belt 6, it is possible, with reference to the phase position of the maximum measured rotation-angle error, to determine the point on the contact surface 7 at which material has to be removed in order at least to reduce the fluctuations in distance or spacing between the strands 11 and the contact surface 7. Through consecutive removals of material, through grinding of the drive belt 6 with little infeed advance and subsequent measuring of the rotation-angle error, one arrives step by step at the state at which the rotation-angle error is below a tolerable value.

The aforedescribed procedure is then performed on a number of drive belts of the same type, the precise manner of material removal being maintained, and only the location and depth of material removal being varied.

A preferred method of material removal is the one in which the depth of material removal is varied along the length of the drive belt 6 in accordance with a sinusoidal curve having a period corresponding to the length of the drive belt, because this already compensates for the major part of the rotation-angle error caused by the aforementioned fluctuations in distance or spacing.

For each drive belt 6 which has been processed to the stage at which the rotation-angle error has been corrected, a written record is made of the initial rotation-angle error, which is sinusoidal to a first approximation, the record being specified in terms of the magnitude and phase of the rotation-angle error, and a written record is further made of the location and depth of the effective removal of material after correction of the rotation-angle error.

A sufficient number of such values forms a table of empirical values, from which it is then possible to read off the location at which and the extent to which material needs to be removed from a drive belt 6 of the type being studied, so that the measured rotation-angle error is completely corrected. It is possible in this manner to perform an error correction very efficiently.

To enable the control device 13 to perform the aforedescribed operations fully or partly automatically, it receives the trigger pulses from the position sensor 8, as well as signals from the evaluation device 10, those pulses and signals indicating the rotation-angle error of the drive belt 6 then in use; and the control device 13 controls the drive motor 3 and the drive and positioning device 15, accordingly.

As has already been mentioned hereinbefore, the actual conditions in the drive belt 6 which result in rotation-angle errors are relatively complex. In the case of drive belts which are constructed from endlessly wound strands, the desired success is achieved by a physical alteration of the given type, particularly by the removal of material from the contact surface of the drive belt. In the case of drive belts with other means of reinforcement, it may be advantageous, particularly also with regard to the technical implementation of the physical alteration, to remove material from the back of the belt.

Whereas the drive belt 6 in the aforedescribed embodiment is subjected to grinding in the same state in which it is mounted in the device 1 for measuring rotation-angle errors, in a second embodiment of the invention, the drive belt 6 is ground separately.

For this purpose, after the drive belt 6 has been measured in the device 1 for measuring rotation-angle errors, it is mounted on an eccentrically mounted, circularly cylindrical mounting device 17, which is shown diagrammatically in FIG. 4 and is described hereinbelow.

A grinding disk 18 rotating axially parallel with the mounting device 17 is adjustably movable towards and away from the contact surface 7 in the directions of a double-headed arrow R.

A rotational shaft 19 of the mounting device 17 is movable around a center point 20 of the mounting device 17 and is fixed in a defined position with respect to the center point 20, so that, during one rotation of the mounting device 17, with a simultaneous infeed advance of the grinding disc 18, the drive belt 6 is provided with a ground profile which is sinusoidal in the longitudinal direction of the drive belt 6.

Of course, the mounting position is also important with regard to the correct phase position of the drive belt 6, it being possible for the mounting position to be determined with the aid of the marking 9, as shown in FIG. 3. If the contact surface 7 is to be ground, it is additionally necessary to turn the drive belt 6.

The adjustment parameters of the mounting device 17, which determine the position and depth of the grinding profile required for correction of the previously measured rotation-angle error, are established experimentally and subsequently used for finish-grinding further drive belts of that type in one operation after the measurement.

We claim:

1. A method for producing a drive belt having a small rotation-angle error, which comprises determining a rotation-angle error of a drive belt, and then removing a drive belt material from a depth of the drive belt to reduce the detected rotational-angle error.

2. The method according to claim 1, which further comprises repeating said rotation-angle error determination step and said drive belt material removal step to further reduce the rotation angle error.

3. The method according to claim 1, wherein the drive belt material is removed in a machining process.

4. The method according to claim 3, which includes maintaining a depth of drive belt material removal constant along a width of the given drive belt, and varying the depth of drive belt material removal along a length of the drive belt according to a sinusoidal curve having a period corresponding to the length of the drive belt.

5. The method according to claim 3, which includes mounting the drive belt on a belt drive device and keeping the drive belt mounted on the belt drive device during determination of the rotation-angle error and the removal of the drive belt material.

6. The method according to claim 3, which includes, before the material removing step, performing the steps of:

mounting the drive belt on a circular disk having an eccentrically positioned rotational axis; and adjusting a distance between the rotational axis and a material removal device.

7. A device for producing a drive belt having a small rotation-angle error comprising:

a device for rotatable mounting a drive belt;

a device for determining a rotation-angel error of the drive belt, said device producing a control signal corresponding to the rotation-angle error;

a material-removing device for removing material from a depth of the drive belt; and a positioner for moving said material-removing device toward the drive belt in response to said control signal so as to reduce the rotation-angle error by removing material from the depth of the drive belt.

8. Drive-belt producing device according to claim 7, wherein said device for rotatably mounting the drive belt is an eccentrically supported circularly cylindrical mounting device.

9. A method of adjusting a transmission of rotational movement of a given drive belt, which comprises:

determining a deviation in the transmission of rotational movement of a given drive belt from an ideal transmission of rotational movement of an ideal drive belt; and removing material from a depth of the given drive belt to reduce the deviation.

10. The method according to claim 9, which further comprises: after said material removing step, determining another deviation in the transmission of rotational movement of the given drive belt from the ideal transmission of rotational movement of the ideal drive belt; and removing additional material from the depth of the given drive belt to further reduce the deviation.

* * * * *